UNITED STATES PATENT OFFICE.

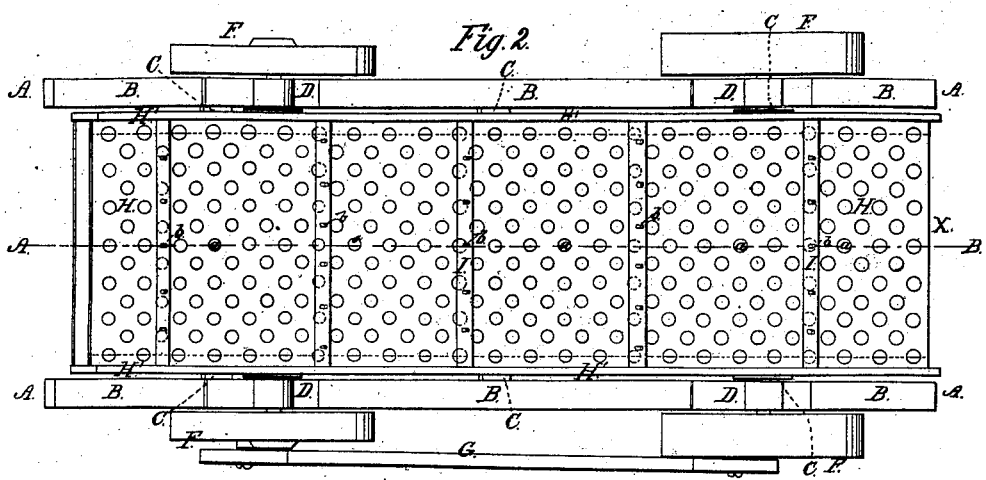
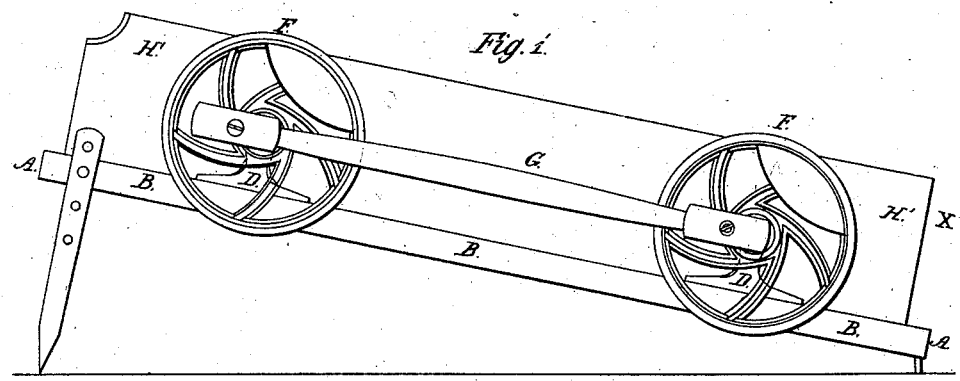
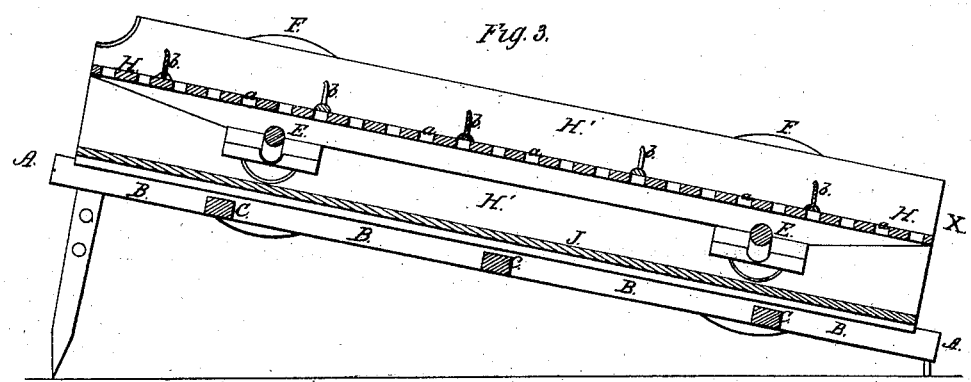

WILLIAM PIERPONT, OF SALEM, NEW JERSEY.

STRAW-CARRIER AND GRAIN-SEPARATOR FOR THRESHING-MACHINES.

Specification of Letters Patent No. 34,010, dated December 24, 1861.

*To all whom it may concern:*

Be it known that I, WILLIAM PIERPONT, of Salem, in the county of Salem and State of New Jersey, have invented certain new and useful Improvements in Straw-Carriers and Seed-Separators for Threshing-Machines; and I do hereby declare that the following is a full, clear, and exact description thereof, reference being had to the accompanying drawing, forming a part of this specification, in which—

Figure 1 represents a side view of the machine to which my improvements are applied. Fig. 2 represents a top or plan view of the same machine, and Fig. 3 represents a longitudinal section on line A, B, Fig. 2.

In the drawings A, represents a frame composed of longitudinal pieces B, B, connected by cross pieces C, C, C.

Upon the ends of the longitudinal pieces B, B, are fastened bearing pieces D, D, D, D, and in which are hung in any suitable manner two crank shafts E, E, on each of which are two cranks, one near each journal. Shafts E, E, project beyond the frame and bearings D, and have a pulley or wheel F, on each end, one or more connecting rods G being used so as to insure both crank-shafts turning together.

On the cranks of shafts E, E, an elongated apron or separator H is supported so as to partake of the motion of the cranks when they revolve. This apron is provided with any desired number of holes a, also with side boards H', H'.

If the end X of the above machine be now placed in such a position as respects a threshing machine as to receive the straw as it is thrown from said machine upon its apron or separator H, and motion is then communicated to either of the wheels or pulleys F, both of the crank-shafts will revolve together, and apron H, partaking of the motion of the cranks upon which it is hung, will throw forward the straw as it rises and then recede as the cranks fall, to repeat the operation upon the straw, whereby the latter is carried forward and finally thrown off at the other end of the apron, while all of the seed that is mixed with the straw is sifted out and separated from the straw and falls down through the holes in the apron H.

The principle of the machine as thus described was patented to me on the 7th day of May, 1850, and has proved very valuable. Experience has shown me that the device thus patented was susceptible of some improvements. In the first place I found that in elevating the end from which the straw was finally thrown off the separation of the seed from the straw was much facilitated, but was attended with some liability of the straw's sliding back toward the threshing machine, especially if the inclination was considerable. To remedy this I fasten a series of cleats I to the top of the apron H and insert in the cleats a series of short curved teeth b, all as fully shown in the drawings, whereby the apron can be inclined even as much as shown in the drawings and yet the straw be carried up and delivered with ease from the elevated end of apron H. Teeth b answer the further purpose of loosening up the straw and separating bunches, whereby much seed is saved which might otherwise be carried out with the straw. I found, too, that the seed which fell through the perforated apron was somewhat scattered and it required some little labor to gather it up, especially when the operation of threshing and cleaning were carried on at the same time. To remedy this I extended the side boards H' down below the apron H, and fastened to the lower edges thereof a tight apron J, directly below apron H, and parallel thereto, as indicated in the drawings, whereby the seed as fast as it fell through apron H was conducted back by apron J and discharged into the fan or chopper to be cleaned. So perfect is the operation of apron J that it will conduct the seed back very quickly, even though the inclination is very slight, owing to the effect of the concussion of the upward motion of the inclined apron J against the seed, which causes it to fly off toward or back to the chopper or fan. Then again the tight bottom causes quite a current of wind to pass up through apron H, which tends also to the more effectual separation of the seed therefrom.

The frame should be of about the same width as the threshing machine and of any desired length.

Apron J may be made so as to slide into grooves in the side boards H', H', so as to be easily removed at any time when it is not wanted.

Having thus described my improvements, what I claim as new and as an improvement on the machine patented to me on the 7th of May, 1850, is—

1. The combination with an elongated perforated apron operated by a crank or cranks having the peculiar motion described, of a series of feeding and separating teeth $b$, substantially as and for the purposes set forth.

2. The combination of a tight apron J, with an elongated apron or pierced platform, hung upon and worked by a crank or cranks having the peculiar motion described, connected with and forming a part of the threshing and separating machine, substantially in the manner and for the purposes herein described.

In witness whereof I have hereunto subscribed my name.

WM. PIERPONT.

Witnesses:
WILLIAM S. MASHEY,
CHAS. L. PIERPONT.